(12) United States Patent
Liechty et al.

(10) Patent No.: US 7,885,606 B2
(45) Date of Patent: Feb. 8, 2011

(54) ASSISTED MEASUREMENT SURVEY OF A WIRELESS COMMUNICATION NETWORK

(75) Inventors: Lorne C. Liechty, Atlanta, GA (US); Keith D. Bray, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 693 days.

(21) Appl. No.: 11/859,028

(22) Filed: Sep. 21, 2007

(65) Prior Publication Data

US 2009/0081956 A1    Mar. 26, 2009

(51) Int. Cl.
*H04B 17/00* (2006.01)
(52) U.S. Cl. .......... 455/67.11; 455/446; 455/63.2; 455/67.14; 455/67.16
(58) Field of Classification Search .......... 455/446, 455/67.11, 63.2, 67.14, 67.16, 423, 424, 455/425, 115, 226.1, 226.2, 226.3
See application file for complete search history.

(56) References Cited

U.S. PATENT DOCUMENTS

| | | | |
|---|---|---|---|
| 7,058,796 B2 | 6/2006 | Lynn et al. | |
| 7,096,160 B2 | 8/2006 | Skidmore et al. | |
| 7,110,756 B2 | 9/2006 | Diener | |
| 7,110,768 B1 | 9/2006 | Bridges et al. | |
| 7,154,874 B2 | 12/2006 | Bhagwat et al. | |
| 7,162,507 B2 | 1/2007 | Carter | |
| 7,171,324 B1 | 1/2007 | Pleasant et al. | |
| 7,180,877 B1 | 2/2007 | Benveniste | |
| 7,181,325 B2 | 2/2007 | Moton, Jr. et al. | |
| 7,184,770 B1 | 2/2007 | Narasimhan et al. | |
| 7,522,884 B2 * | 4/2009 | Turner et al. | 455/67.11 |
| 2004/0133415 A1 | 7/2004 | Rappaport et al. | |

FOREIGN PATENT DOCUMENTS

WO     2007091777 A1     8/2007

* cited by examiner

*Primary Examiner*—Tuan A Pham
(74) *Attorney, Agent, or Firm*—Brian M. Mancini; Anthony P. Curtis

(57) ABSTRACT

An apparatus and method for providing measurement assistance in a survey of a wireless communication network includes a first step (1) of defining a scope of measurement targets to complete the survey. A next step (2) includes measuring an RF parameter at a specific spatial coordinate. A next step (3) includes analyzing the measurement to determine if the measurement is valid. A next step (5) includes storing the measurement. A next step (6) includes recommending further measurement locations for survey completeness. A next step (4) includes determining whether the survey is complete. A next step (7) includes implementing the wireless communication network in accordance with the final survey.

19 Claims, 1 Drawing Sheet

ASSISTED MEASUREMENT SURVEY OF A WIRELESS COMMUNICATION NETWORK

FIELD OF THE INVENTION

The present invention relates generally to wireless communication networks, and in particular, an apparatus and method for assisting a measurement survey of a wireless communication network.

BACKGROUND OF THE INVENTION

When a wireless communication network is deployed or is planned for deployment, it is necessary to perform radio frequency (RF) measurement surveys in order to verify the performance of the deployed network and/or to obtain a proper characterization of the existing RF environment of the network. To accomplish this task, the survey designer must first define the survey scope, a field technician must perform the data collection covering the survey scope for the survey designer, and the survey designer must then perform an analysis of the acquired data in order to determine the validity and completeness of the survey. Because measurement surveys can be prone to error for a number of reasons (i.e. hardware error, inconsistent methodology, etc.), this process is often cyclic, time-consuming, and expensive.

Today, site-surveys typically require a field RF technician or engineer to analyze the acquired data and/or assist in the measurement survey data acquisition process. The RF technician participates in the survey or post analyses process to ensure that a complete survey is obtained which sufficiently characterizes the RF environment. However, existing methods are prone to error even when an RF engineer is involved in the process. Field technicians rarely have the level of RF experience required to analyze the validity of collected data as the survey is being taken. In addition, it is costly to have the RF Engineer spend time on-site manually performing the survey and analysis. Despite these issues, a better solution is not readily available.

Current survey methods require that analysis of the collected data (including validity checks) and determination of the completeness of the measurement survey occur only after the survey has been performed and often at a different location (wherever the RF Engineer may be located). Due to the sometimes overwhelming amount of data that is needed for a complete survey, the high cost of survey cycles, and the sensitivity of measurement surveys to invalid measurements, measurement campaigns are sometimes accepted as being complete when more data is actually desired but too costly or time consuming to pursue.

Therefore, a need exists for a process which will reduce the number of survey acquisition and analysis cycles required in order to produce highly accurate measurements of a given RF environment.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Figure 1:
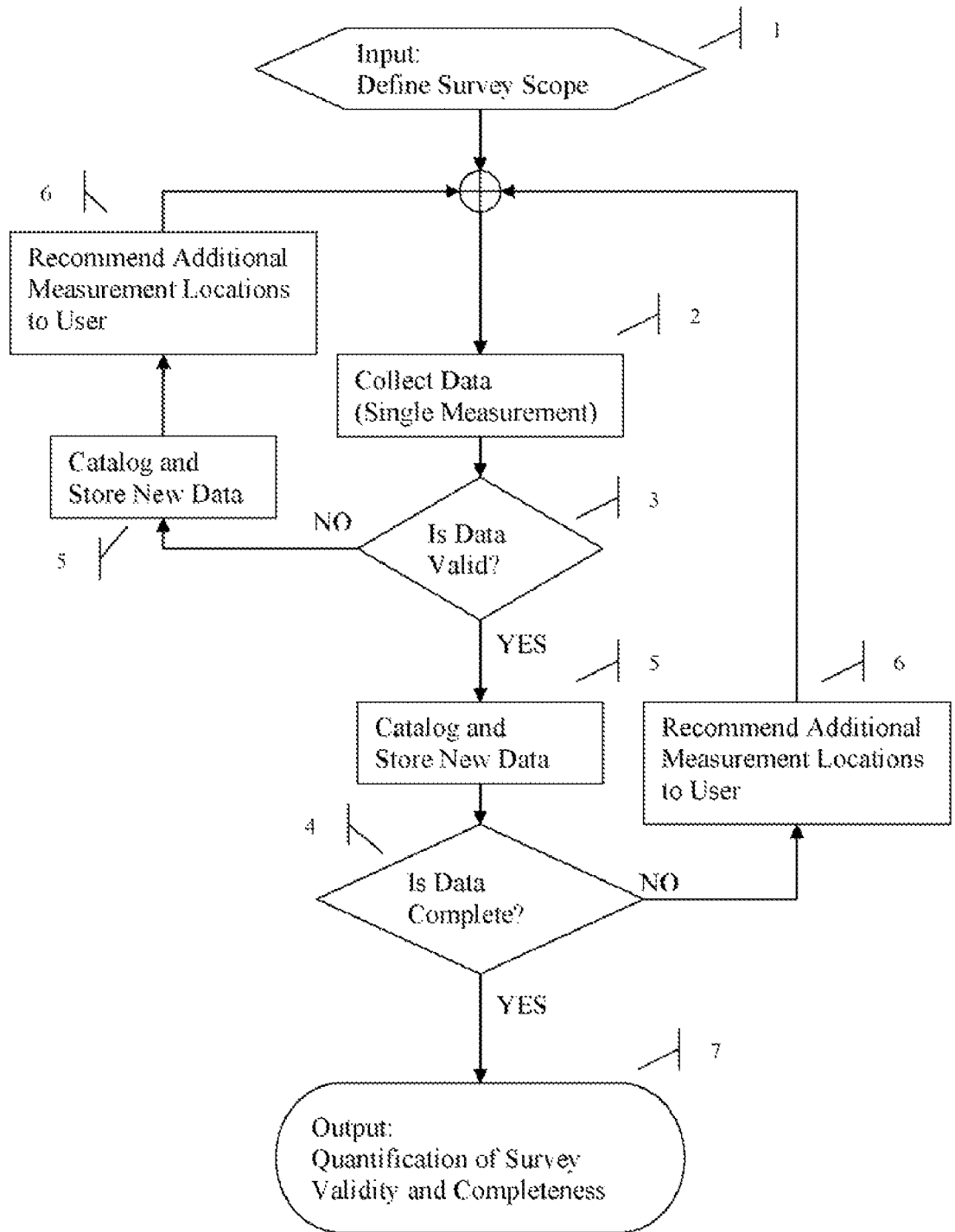
FIG. 1 illustrates a simplified flow diagram of a method, in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENT

The present invention provides an apparatus and method to analyze the acquired measurement data of a survey to assess its validity both during the survey (real-time) and after (post analysis), and improve the quality of the survey by assisting the user in knowing where to take measurements, and by providing confirmation of when enough measurement data has been collected, in order to adequately characterize the RF environment of the wireless communication network. As a result, the additional number of required survey acquisition and analysis cycles required in order to produce highly accurate, complete measurement surveys of a given RF environment are drastically reduced, if not completely eliminated. In particular, the present invention solves this problem by providing continuous real-time measurement survey analysis and verification of acquired measurement data using an existing 3D, site-specific model of the RF environment.

FIG. 1 illustrates the apparatus and method for providing measurement assistance in a survey of a wireless communication network, in accordance with the present invention. This method consists of seven main process blocks which are described below.

Step 1 defines the survey scope. The survey scope is defined by the survey designer. The scope outlines a) spatial targets, b) network targets, and c) RF propagation model targets used to quantify the completion of the measurement survey. Spatial Targets are defined by spatial coordinates which specify a bounded region for which the user would like to obtain a measured characterization. Network Targets are defined by specified wireless network infrastructure for which the user would like to obtain a measured characterization. RF Propagation Model Targets are defined by specified RF propagation model parameters (i.e. path loss exponent, frequency, bandwidth, etc.) for which the user would like to obtain a measured characterization.

Step 2 provides data collection. The data collection process involves measuring the RF environment (e.g. an RF parameter defined in the scope, such as measuring the Received Signal Strength Indication, RSSI) at a specific spatial coordinate in the network using the appropriate testing apparatus, and making that measurement available for storage (Step 5) and future analysis.

Step 3 provides validity analysis. In order to obtain the best measurement survey possible, all of the acquired data must be analyzed to determine whether or not it is valid. This may be done using various methods, including but not limited to; a) Direct Analysis of Individual Measured Value, where a measurement may be determined to be invalid if its value is outside of a given "sanity check" range of acceptable values (e.g. an RSSI measurement which is outside the dynamic range of the RF receiver), b) Measured Value vs. Predicted Value, where a measurement may be determined to be invalid if the absolute deviation of its value from a prediction of the value at that point is beyond a given threshold, c) Measured Value vs. Measured Value, where a measurement may be determined to be invalid if its value falls beyond some threshold value of the statistical distribution of other previous measurements in a specified local area (e.g. a measured value of five, when the local area has a normal distribution with a zero mean and standard deviation of one and the validity threshold is set to three standard deviations), and d) Measured Value vs. Measured Value, where a measurement may be determined to be invalid if its value falls beyond some threshold value of the statistical distribution of other previous measurements which share similar RF propagation model characteristics as determined by site-specific information (e.g. a Line-of-Sight measurement of five, when other Line-of-Sight measurements with similar distances from the transmitter have a normal distribution with a zero mean and standard deviation of one and the validity threshold is set to three standard deviations).

Although post analysis of measured data is known in any survey process, the present invention allows the surveyor to gain a quantified understanding of the quality of the measurement run as it is being performed. As an example, comparing real-time measured data to predicted values from a given propagation model and known site-specific information can provide valuable feedback to the user concerning the validity of their on-going measurement survey. In addition, the present invention can consider all previously collected data in the survey. From these considerations, the likelihood of a survey being invalidated due to uncharacteristic measurements can be drastically reduced.

Step 4 provides a Completion Analysis to determine from the stored measurements whether survey satisfies the requirements of the defined survey scope. The valid measurement points of each survey can be analyzed in order to determine whether or not each survey target has been sufficiently measured. The completion of a measurement survey can be determined in various ways, including but not limited to; a) Number of Measurements, where a survey is determined to be complete when the user has obtained a sufficient number of valid measurement points to meet each measurement aspect of the survey scope (e.g. the number of measurements defined for each aspect laid out in the scope), b) Spatial Distribution of Measurements, where a survey is determined to be complete when the surveyor has taken enough measurement points to satisfy a pre-determined spatial distribution for a survey target of the scope (e.g. It may be required that the surveyor take measurements every ten meters, within Line-of-Sight regions, such as between a predicted coverage range of −70 dBm to −90 dBm, for example), and c) RF Propagation Model Measurements, where a survey is determined to be complete when the surveyor has taken enough measurements that the parameter value of a given RF Propagation Model target can be determined to within some predetermined accuracy boundary for a given error metric (e.g. Taking a sufficient number of Line-of-Sight measurements until a path loss exponent can be determined which fits the acquired data points to within an accuracy of 0.5 dB mean error and 5.0 dB standard deviation of the model error).

A novel aspect of the invention is providing real-time assessment of completeness to allow the surveyor (user) to gain a better understand of the changing demands of complex survey goals. For example, if a survey goal is defined as taking drive-test measurements of an established 802.11 network with a defined spatial resolution along Line-of-Sight paths, for a given Media Access Control (MAC) address, it can be extremely difficult to simultaneously monitor all incoming data, and additionally determine how completely the network is being measured. In addition, the present invention can consider all previously collected data in the survey.

Step 5 provides Cataloging and Storing Acquired Data. As measured data is being collected, the data can be stored for later analysis. When the data is stored it can be cataloged using descriptive characteristics, such as whether the measurement was determined to valid or invalid.

Step 6 provides Recommending Measurement Locations to the User (in real-time). As the survey progresses, the discovery of invalid measurement points may result in the need for additional measurements to be taken in order for survey completeness to be obtained. Recommended measurement locations are automatically provided to the surveyor in real-time so that they know how to best complete the survey, and the locations to take measurements should be prioritized based on the defined scope. For example, if questionable data exists for a measurement in one location, it can be suggested to take more measurements in other spatially diverse locations to gain confidence in the original measurement or just use the new measurements. The recommended locations of measurements may be determined using various methods, including but not limited to; a) To Obtain a Valid Measurement in the Event of an Invalid Measurement, where in the event of an invalid measurement, additional measurement locations may be suggested according to a given distribution around the local area of the invalid measurement (i.e. if an RSSI measurement is seemingly invalid due to random small-scale fading, take additional measurements in an area with a radius of one meter, with a resolution of 0.2 meters), b) Spatial Target, where additional measurement locations for a spatial target may be determined according to a required spatial (geographical) distribution to be met for measurements within the spatial bounds of the spatial target and with a particular granularity or resolution within the spatial target area, c) Network Target, where additional measurement locations for a network target may be determined using a predicted value range boundary where locations are added and updated to define a contour of a particular minimum signal level, for example (i.e. make RSSI measurements along the predicted boundary for greater than −80 dBm coverage and add locations until this boundary is well defined, for example), and d) RF Propagation Model Target, where additional measurement locations for a network target may be determined using a predetermined 3D, site-specific model of the RF environment. The user may be requested to make measurements in locations for which the calculated value for the propagation model is known to include a given RF Propagation Model Target (e.g. suggesting that the user make measurements in Line-of-Sight or Non-Line-of-Sight paths until predictions meet a particular confidence level).

Within the framework of known solutions, measurement locations for the survey are defined prior to the on-site measurement collection process. In contrast, the present invention provides additional measurement location suggestions to the surveyor during the survey process, in real-time. For example, in the event of questionable measurements the surveyor can be prompted to take additional measurements in order to properly characterize the environment with a high level of confidence.

Step 7 provides a Final Output of Survey Results. The final measurement survey should be quantified in terms of its validity and completeness with respect to the predetermined survey scope. This quantification should be made available to the user for the configuration and implementation of the wireless communication network.

In operation, the present invention can provide one or more of the following features:

Feature 1—Indicate to the user the deviance in received signal power (from one or more sources) versus expected (predicted) value. Using the predicted received signal strength at various locations in the environment, the user can be alerted (real-time) during the measurement survey when a collected measurement reading deviates from the expected value and by how much the value deviates.

Feature 2—Indicate to the user the deviance in received signal power compared to previously recorded measurements with similar RF propagation model characteristics. This analysis can be accomplished by examining the variation of the RSSI between spatially close neighboring measurements. In example, there are situations where the measured RSSI may vary by +/−15 dB between individual points that are all grouped closely together (within a few meters), and that all share the same path characteristics (i.e. Line of Sight). Such large variations in RSSI can be accounted for by a number of propagation effects, such as small scale fading and temporal fading, however these effects are often considered to be random and not indicative of the large scale path loss which is predicted by the RF propagation model.

Feature 3—Indicate to the user areas where additional measurements should be recorded. Recording additional measurement points in areas where large deviations (i.e. beyond a predicted range) occur can help isolate the problem from a post analysis or optimization perspective. This feature would assist the user by providing notification to take more measurements in problem areas in order to better characterize the RSSI value for that region. By using a history of the recorded measurements to establish a "baseline" RSSI value for a spatial region, the application would be able to determine the validity of new measurements based upon this "baseline" value, as well as correct possible errors in a previous "baseline" estimation of the RF environment.

Feature 4—Optionally, prevent including uncharacteristic measurements in the data set automatically (data would still be logged for analysis purposes) when signals spike out of a particular range. In general, if a one-off random fluctuation in received signal occurs, the feature could put the uncharacteristic measurement in a list of potentially bad measurement points (real-time during the measurement collection). In other situations, particularly areas of an environment where a baseline has not been established for discerning a one-off invalid measurement, this feature may not be useful. Instead, upon analyzing these deviations, the feature would indicate that more measurements should be taken so that a better baseline can be established (see Feature 3 above).

Feature 5—Allows the user to prune measurements that are analyzed by the system and determined to be uncharacteristic. An uncharacteristic measurement could be determined using a combination of methods (see the description for method Step 3 above). After a measurement survey has been completed (or during the measurement survey itself), the user may be provided the option of removing some deviant measurements from their survey once those values have been shown to be uncharacteristic of the whole, and more accurately attributed to device error, user error, etc. This provides the user the ability to remove deviant measurements which are not automatically prevented from inclusion due to larger variations which can be immediately detected (see Feature 4 above).

Feature 6—In addition to providing the user with a quantification of the survey validity and completeness in terms of the included valid measurements, provide the user with a list of measurements which have been excluded from the measurement survey (either automatically or by user action), and quantify the impact of the removed measurements (e.g., mean error and standard deviation of measured results vs. predicted model). Additionally, provide the user with the option of reinserting removed measurements into the survey either in mass or individually. However, once the surveying session has been closed, these excluded points could be permanently discarded if desired.

Advantageously, the present invention combines predicted/simulated network data with measurement data to provide real-time ongoing analysis, completion analysis, and recommended measurement locations of a sire-specific survey.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for providing measurement assistance in a survey of a wireless communication network, the method comprising the steps of:

defining a scope of measurement targets to complete the survey, the scope outlining spatial target defined by spatial coordinates which specify a bounded region for which a measured characterization is to be obtained, network targets defined by a specified wireless network infrastructure for which the measured characterization is to be obtained, and RF propagation model targets defined by specified RF propagation model parameters for which the measured characterization is to be obtained;

measuring, as defined in the scope, an RF parameter in the network;

analyzing the measurement to determine if the measurement is valid;
storing the measurement and returning to the measuring step;
upon an insufficient measurement, recommending further measurement locations for survey completeness, and returning to the measuring step;
determining whether the survey is complete by at least determining whether sufficient valid measurements exist such that a parameter value of a given RF propagation model target can be determined to within a predetermined accuracy for a given error metric, wherein if the survey is incomplete returning to the recommending step; and
implementing the wireless communication network in accordance with the final measurements of the survey.

2. The method of claim 1, wherein the analyzing step includes a direct analysis of an individual measurement against a range of acceptable values, the individual measurement being determined to he invalid if outside the range of a given "sanity check" range of acceptable values.

3. The method of claim 1, wherein the analyzing step includes a comparison of an individual measurement against a predicted value, the predicted value predicted from a given RF propagation model and known site-specific information prior to taking the individual measurement.

4. The method of claim 1, wherein the analyzing step includes determining validity through comparison of a measurement of a user against a threshold value of a statistical distribution of previous measurements.

5. The method of claim 1, wherein the determining step includes determining whether at least one of:
a predetermined number of valid measurements meet each measurement aspect of the scope, or
sufficient valid measurements exist to satisfy a pre-determined spatial distribution for a survey target.

6. The method of claim 1, wherein the recommending step includes recommending additional measurement locations according to at least one of:
a given distribution around the local area of the invalid measurement,
a required spatial distribution to be met for measurements within the bounds of the spatial target, or
a predicted value range boundary.

7. The method of claim 1, wherein the recommending step includes recommending additional measurement locations according to a predetermined site-specific model of an RF environment.

8. A method for providing measurement assistance in a survey of a wireless communication network, the method comprising the steps of:
defining a scope of measurement targets to complete the survey, the scope outlining spatial target defined by spatial coordinates which specify a bounded region for which a measured characterization is to be obtained, network targets defined by a specified wireless network infrastructure for which the measured characterization is to be obtained, and RF propagation model targets defined by specified RF propagation model parameters for which the measured characterization is to be obtained;
measuring, as defined in the scope, an RF parameter at a specific spatial coordinate in the network;
analyzing the measurement to determine if the measurement is valid;
storing the measurement and its validity and returning to the measuring step;
upon an insufficient measurement, recommending further measurement locations for survey completeness, and returning to the measuring step;
determining from the stored measurements whether the survey is complete by at least determining whether sufficient valid measurements exist such that a parameter value of a given RF propagation model target can be determined to within a predetermined accuracy for a given error metric, wherein if the survey is incomplete returning to the recommending step; and
implementing the wireless communication network in accordance with the final measurements of the survey.

9. The method of claim 8, wherein the analyzing step includes indicating to a user a statistical deviance in a measurement compared to a predicted value.

10. The method of claim 8, wherein the analyzing step includes indicating to a user a deviance in a measurement compared to a previous measurement with similar RF propagation model characteristics.

11. The method of claim 8, wherein the recommending step includes recommending additional measurement locations in areas where measurement deviations are beyond a predicted range from a baseline of previous measurements.

12. The method of claim 8, wherein the storing step includes optionally allowing a user to control the exclusion of particular measurements in storage.

13. The method of claim 8, wherein the determining step includes providing statistics on the complete survey.

14. The method of claim 8, wherein the determining step includes providing statistics on the invalid measurements.

15. The method of claim 4, wherein the previous measurements, which may be non-local to the measurement, share similar RF propagation model characteristics with the measurement as determined by site-specific information.

16. The method of claim 4, wherein the previous measurements fall within a specified area local to the measurement.

17. The method of claim 1, wherein analyzing the measurement comprises in real time during the survey at least one of:
determining when and by how much the measurement deviates from a predicted value,
determining deviation of the measurement from previously recorded measurements with similar RF propagation model characteristics by examining variations between spatially close neighboring measurements,
determining areas where additional measurements should be recorded due to the existence of deviations beyond a predicted range, the predicted range established using a history of recorded measurements to establish a baseline value for a spatial region, or
preventing inclusion of uncharacteristic measurements automatically, while storing the uncharacteristic measurements.

18. The method of claim 1, further comprising providing a list of removed measurements which have been removed from the survey, quantifying the impact of the removed measurements and providing an option of reinserting at least one of the removed measurements back into the survey.

19. The method of claim 1, wherein analyzing the measurement comprises determining in real-time whether questionable data exists for an original measurement in one location, and recommending a course of action to take in response thereto, the course of action selected from:
taking additional measurements in other spatially diverse locations around a local area of the original measurement to gain confidence in the original measurement, taking additional measurement locations for a spatial target according to a predetermined spatial distribution to be met for measurements within spatial bounds of the spatial target and with a particular granularity or resolution within the spatial target area, taking additional measurement locations for a network target using a predicted value range boundary where locations are added and updated to define a contour of a particular minimum signal level, and taking additional measurement locations for a network target using a predetermined 3D, site-specific model of an RF environment.

* * * * *

UNITED STATES PATENT AND TRADEMARK OFFICE
CERTIFICATE OF CORRECTION

| | | |
|---|---|---|
| PATENT NO. | : 7,885,606 B2 | Page 1 of 1 |
| APPLICATION NO. | : 11/859028 | |
| DATED | : February 8, 2011 | |
| INVENTOR(S) | : Liechty et al. | |

It is certified that error appears in the above-identified patent and that said Letters Patent is hereby corrected as shown below:

In Column 7, Line 20, in Claim 2, delete "he" and insert -- be --, therefor.

Signed and Sealed this
Twenty-fifth Day of December, 2012

David J. Kappos
*Director of the United States Patent and Trademark Office*